United States Patent
Miyazaki et al.

(10) Patent No.: US 7,616,539 B2
(45) Date of Patent: Nov. 10, 2009

(54) OPTICAL DISC APPARATUS, TRACKING CONTROL METHOD, AND INTEGRATED CIRCUIT

(75) Inventors: Kazuhiko Miyazaki, Kyoto (JP); Kiyoshi Masaki, Hyogo (JP); Hideki Shirane, Ehime (JP)

(73) Assignee: Panasonic Corporation, Osaka (JP)

( * ) Notice: Subject to any disclaimer, the term of this patent is extended or adjusted under 35 U.S.C. 154(b) by 302 days.

(21) Appl. No.: 11/708,712

(22) Filed: Feb. 21, 2007

(65) Prior Publication Data

US 2007/0211588 A1  Sep. 13, 2007

(30) Foreign Application Priority Data

Feb. 21, 2006  (JP)  ............... 2006-044413

(51) Int. Cl.
  *G11B 7/095*  (2006.01)
(52) U.S. Cl. ................... 369/44.29; 369/44.41
(58) Field of Classification Search ............... 369/30.1, 369/44.29, 44.41, 53.28
  See application file for complete search history.

(56) References Cited

U.S. PATENT DOCUMENTS

| | | | |
|---|---|---|---|
| 5,227,930 A | | 7/1993 | Thanos et al. |
| 5,228,018 A | * | 7/1993 | Rokutan ................... 369/44.29 |
| 5,633,846 A | * | 5/1997 | Okuyama et al. ......... 369/44.34 |
| 5,715,223 A | * | 2/1998 | Ohtomo ................... 369/53.13 |
| 6,031,799 A | | 2/2000 | Hwang |
| 6,195,319 B1 | | 2/2001 | Ohshita et al. |
| 7,215,607 B2 | * | 5/2007 | Watanabe et al. ......... 369/44.29 |
| 2003/0072227 A1 | | 4/2003 | Yamashita et al. |
| 2005/0088932 A1 | * | 4/2005 | Tanaka .................... 369/44.29 |
| 2005/0265153 A1 | * | 12/2005 | Stallinga et al. .......... 369/44.41 |

FOREIGN PATENT DOCUMENTS

| | | |
|---|---|---|
| JP | 2000-20968 A | 1/2000 |
| JP | 2000-315327 A | 11/2000 |

OTHER PUBLICATIONS

Machine translation of JP11-007639A into English, Aizawa et al.*

* cited by examiner

*Primary Examiner*—Wayne R Young
*Assistant Examiner*—Brian Butcher
(74) *Attorney, Agent, or Firm*—McDermott Will & Emery LLP

(57) ABSTRACT

An optical disc apparatus has: an optical head 400 for emitting a light beam onto a predetermined track of an optical disc 300 before tracking control in order to detect reflected light with a photodetector; an arithmetic circuit 130 for generating measurement signals each indicative of a time-varying change of light received on a respective one of a plurality of light receiving areas of the photodetector; an A/D converter circuit 140 for A/D converting each measurement signal; a microcomputer 190 for determining a correction value based on a difference, in terms of high- and low-frequency components, between measurement signals having been A/D converted; and an adder circuit 180 for adding the correction value to a driving value output from a tracking control circuit 170, so that the driving value is corrected.

17 Claims, 7 Drawing Sheets

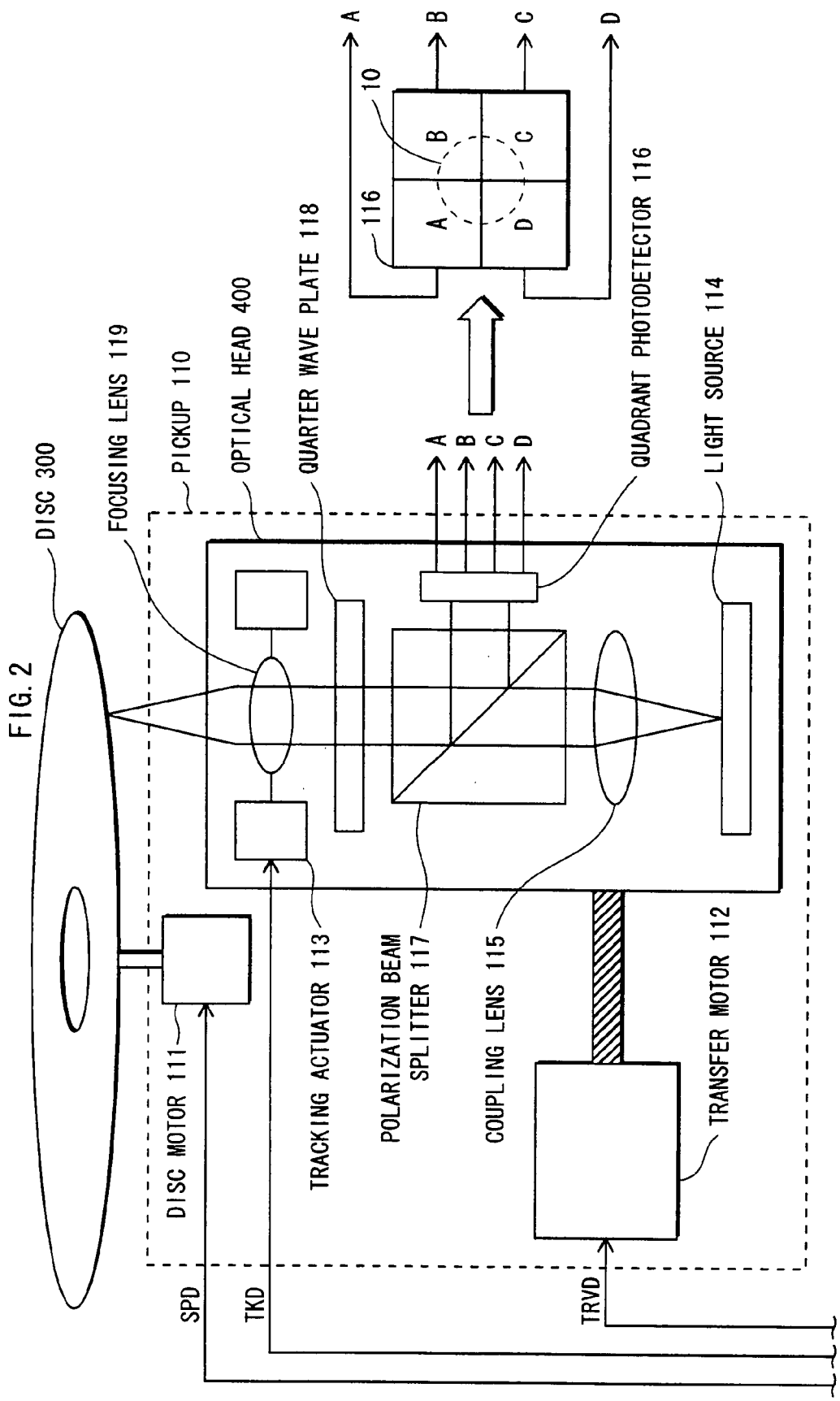

MODULATION FACTOR [%] = $(\alpha_1 - \beta_1)/\beta_1 \times 100$

MODULATION FACTOR [%] = $(\alpha_2 - \beta_2)/\beta_2 \times 100$

Prior Art

OPTICAL DISC APPARATUS, TRACKING CONTROL METHOD, AND INTEGRATED CIRCUIT

BACKGROUND OF THE INVENTION (1) Field of the Invention

The present invention relates to an optical disc apparatus and more particularly to tracking control (2) Description of the Related Art The following describes tracking control according to the state of the art, with reference to FIG. 7.

FIG. 7 illustrate various states in which a quadrant photodetector 116 receives light reflected from an optical disc without tracking control. FIG. 7 also illustrate a tracking error signal 11 (hereinafter, "TE signal") generated responsive to the reflected light received by the quadrant photodetector 116 in each state. The reference potential illustrated in each FIG. 7 is the reference potential of a non-illustrated circuit for tracking control (hereinafter, "tracking control circuit").

The tracking control circuit is designed to achieve tracking control in the manner described below. It is noted that the amplitude center of a TE signal corresponds to the center line of the track. Thus, under the condition where the TE signal amplitude center is not deviated from the potential used as a reference for tracking control, the tracking circuit operates to cause the TE signal to cross the reference potential at points corresponding to the center line of the track. As a result, it is ensured that the optical head is kept at a position over the center line of the track. In other words, the control circuit is designed to control a tracking actuator so as to minimize the difference between the TE signal amplitude center and the reference voltage 0. Ideally, the tracking actuator is driven so that the TE signal amplitude center becomes equal to the reference potential 0 illustrated in FIG. 7.

The TE signal is generated based on signals each indicative of light detected in a respective one of the light receiving areas of the quadrant photodetector 116. When the tracking control is OFF, the waveform of the TE signal 11 is, for example, sinusoidal as illustrated in FIG. 7. The sine wave represents changes in the amount of light received while the light beam traverses a plurality of tracks due to, for example, eccentric rotation of the optical disc. The TE signal deviates more and more from the reference potential 0 as the positional deviation of the light beam from the center line of the track increases. Similarly, the TE signal deviates less and less from the reference potential 0 as the positional deviation of the light beam from the center line of the track decreases.

Note that the dotted circles in FIG. 7 each represent a beam spot 10. FIG. 7A illustrates the state in which neither the quadrant photodetector 116 nor the beam spot 10 deviates from the center line of the track. FIGS. 7B and 7C illustrate the states in which the quadrant photodetector 116 and the beam spot 10 deviate from the center line of the track either inwardly or outwardly. In addition, the four quadrants of the quadrant photodetector 116 are divided into two light receiving areas along the direction of the tracks of the optical disc. In the figure, one of the light receiving areas is composed of quadrants A and D and the other composed of quadrants B and C. The TE signal is indicative of the difference between two signals output from the respective light receiving areas.

In the state illustrated in FIG. 7A, the quadrant photodetector 116 does not deviate from the center line of the track. Thus, the amplitude center of TE signal corresponds to the center line of the track and the TE signal is symmetrical about the reference potential 0. In such a case, the tracking control circuit drives the tracking actuator so as to minimize the deviation of the TE signal from the reference potential 0. As a result, the light beam is caused to follow the center line of the track.

On the other hand, in the states illustrated in FIGS. 7B and 7C, the quadrant photodetector 116 deviates from the center line of the track. Thus, the amplitude center of TE signal does not correspond to the center line of the track and the detected TE signal involves deviation from the reference potential 0. Yet, the conventional tracking control circuit still assumes that the TE signal amplitude center corresponds to the center line of the track and drives the tracking actuator to provide electrical offset to correct the asymmetrical TE signal to be symmetrical. The tracking actuator is then driven to minimize the deviation of the corrected TE signal from the reference voltage 0 with an intention to achieve precipice track following. Unfortunately, however, with this tracking control, the optical beam is caused to follow a radial position deviated from the center line of the track.

The documents listed below disclose conventional attempts to improve the accuracy of tracking control in the cases, as illustrated in FIGS. 7B and 7C, where the quadrant photodetector 116 and the beam spot deviates inwardly or outwardly from the center line of the track.

JP patent application publication No. 2000-20968 discloses a technique of easy and highly accurate servo balance adjustment for focusing control and tracking control during recording of an optical disc. According to the tracking control disclosed therein, the servo balance is adjusted so that the wobble components contained in a playback signal are kept equal or substantially equal to the minimum level.

JP patent application publication No. 2000-315327 discloses a technique of improving the accuracy of tracking control. According to the disclosure, if the position of a focusing lens is deviated at the initial state before tracking control, a TE signal detected at the initial state is corrected. More specifically, a TE signal is detected before tracking control, based on electric signals each indicative of the amount of light received by the photodetector and the balance of the TE signal amplitude is measured. The position of the focusing lens is shifted to provide symmetry in TE signal amplitude.

SUMMARY OF THE INVENTION

Unfortunately, however, JP patent application publication No. 2000-20968 has the setback described below. That is, the wobble signal cannot be detected unless the optical beam is on track. That is to say, it is required to perform focusing control and/or tracking control to measure the wobble signal amplitude. In the case where the focusing lens and/or the photodetector are deviated at the initial state before tracking control, the tracking control cannot be initiated, so that the light beam cannot be moved to the position on the desired track of the optical disc. Thus, the wobble signal measurement is impossible in such a case. Furthermore, DVD-ROM (Digital Versatile Disk Read Only Memory) is not provided with wobble components. Thus, the technique disclosed in JP patent application publication No. 2000-20968 is not applicable for tracking control adjustment of DVD-ROM.

Next, the setback of JP patent application publication No. 2000-315327 is discussed. FIG. 6 illustrates changes in TE signal symmetry of a typical optical disc other than DVD-RAM (Digital Versatile Disk Random Access Memory) and of a DVD-RAM, both in relation to the positions of the beam spot on the photodetector.

As illustrated in FIG. 6, the DVD-RAM exhibits smaller changes in TE signal symmetry in response to the positional change of the beam spot on the photodetector, as compared with a typical optical disc. That is to say, DVD-RAM has a characteristic that its TE signal symmetry is less sensitive to the positional deviation of the beam spot on the photodetector. As described above, the technique disclosed in JP patent application publication No. 2000-315327 is to correct the positional deviation of the beam spot on the photodetector based on TE signal symmetry. It is thus difficult to improve the accuracy of correction when the disclosed technique is applied to DVD-RAM and other optical discs having a characteristic similar to DVD-RAM.

The present invention is made in view of the problems noted above and aims to provide an optical disc apparatus capable of improving the accuracy of tracking control, even if the focusing lens and possibly other elements are positionally deviated at the initial state before tracking control.

In order to achieve the above aim, an optical disc apparatus according to the present invention is for accessing a desired one of a plurality of tracks on an optical disc. The optical disc apparatus has an optical head including: a light source operable to emit a light beam; a focusing lens operable to focus the light beam onto the optical disc; a photodetector having a plurality of light receiving areas and operable to successively receive the light beam reflected from the optical disc; and a lens drive operable to move the focusing lens along a radial direction of the optical disc, in accordance with input to the lens drive. The optical disc apparatus further has: an optical head driving unit operable to move the optical head along the radial direction of the optical disc, in accordance with input to the optical head driving unit; a measurement signal generating unit operable to generate measurement signals each indicative of a time-varying amount of light received on a respective one of the light receiving areas, the light being the light beam emitted by the optical head and reflected from different radial positions on the optical disc being rotated; a correction value determining unit operable, before tracking control, to (i) sequentially input, to the lens drive, preset values each determined in advance for moving the focusing lens, thereby causing the focusing lens to be sequentially moved in accordance with the preset values to a plurality of positions along the radial direction of the optical disc, and (ii) determine a correction value based on a difference between measurement signals in terms of predetermined low- and high-frequency components, the measurement signals being generated by the measurement signal generating unit as a result that the focusing lens is sequentially moved in accordance with the respective preset values; and a tracking control unit operable to perform tracking control after the correction value determining unit determines the correction value, by inputting to the lens drive unit a sum of the determined correction value and a control value determined for moving the focusing lens to a position corresponding to the desired track. The tracking control unit maybe operable to (i) detect a positional deviation of the light beam from the desired track based on the measurement signals using a push-pull method, (ii) set a target position relative to the desired track based on the detected deviation, and (iii) update the control value so as to cause the light beam to follow the target position.

Note that to "access" refers to making a data read operation or a data write operation to the optical disc. The "preset value" refers to a value determined for moving the focusing lens in the radial direction of the optical disc at the time of signal measurements.

In addition, the "control value" refers to a driving value for moving the focusing lens so as to cause the light beam to follow a desired one of the tracks, after determining the target position. The target position is set in view of the positional deviation of the light beam from the desired track, detected based on the TE signal that is generated from the signals each indicative of the detected amount of reflected light.

The "correction value" refers to a value used for correcting the driving value mentioned above. That is, the correction value refers to a value used for correcting the positional deviation of such elements as a focusing lens and a photodetector from a position corresponding to the center line of the track (hereinafter, each of such elements for detecting light reflected from the optical disc is referred to as a "detecting element").

The "predetermined low-frequency component(s)" refers to component(s) mainly representing the changes in light reflected from lands and grooves on the optical disc when the optical beam traverses in the radial direction a plurality of tracks of the optical disc. On the other hand, the "predetermined high-frequency component(s) refers to component(s) mainly representing the changes in light reflected from pits and recorded and unrecorded areas on the optical disc.

With the above structure, the optical disc apparatus according to the present invention determines, before initiating tracking control, a correction value using measurement signals containing high-frequency components representing light reflected from lands, groves, and pits on the optical disc. The optical disc apparatus then performs tracking control based on the correction value. Consequently, the tracking control is performed with improved accuracy to assure stable playback, as compared with the conventional technique of electrically correcting the TE signal asymmetry resulting from the positional deviation of one or more detecting elements.

In addition, the optical disc apparatus according to the present invention is applicable to tracking control of DVD-RAM and other optical discs having the above noted characteristic and still achieves highly precise tracking control. The highly precise tracking control is achieved by accurately detecting the positional deviation between the beam spot and the center line of the track, resulting from the positional deviation of one or more detecting elements.

According to another aspect of the present invention, an optical disc apparatus is for accessing a desired one of a plurality of tracks on an optical disc. The optical disc apparatus has an optical head including: a light source operable to emit a light beam; a focusing lens operable to focus the light beam onto the optical disc; a photodetector having a plurality of light receiving areas and operable to successively receive the light beam reflected from the optical disc; and a lens drive operable to move the focusing lens along a radial direction of the optical disc, in accordance with input to the lens drive. The optical disc apparatus further has: an optical head driving unit operable to move the optical head along the radial direction of the optical disc, in accordance with input to the optical head driving unit; a measurement signal generating unit operable to generate measurement signals each indicative of a time-varying amount of light received on a respective one of the light receiving areas, the light being the light beam emitted by the optical head and reflected from different radial positions on the optical disc being rotated; a correction value determining unit operable, before tracking control, to (i) sequentially input, to the lens drive, preset values each determined in advance for moving the focusing lens, thereby causing the focusing lens to be sequentially moved in accordance with the preset values to a plurality of positions along the radial direction of the optical disc, (ii) measure a modulation factor of each of a plurality of measurement signals generated by the measurement signal generating unit as a result that the focusing lens is sequentially moved in accordance with the respective preset values, and (iii) determine, as a correction value, one of the preset values according to which the resulting modulation factors are substantially equal between two of the measurement signals indicative of time-varying amounts of light received on two of the light receiving areas located at two different positions along the radial direction of the optical disc; and a tracking control unit operable to perform tracking control after the correction value determining unit determines the correction value, by inputting to the lens drive unit a sum of the determined correction value and a control value determined for moving the focusing lens to a position corresponding to the desired track. The correction value determining unit may be operable to measure a modulation factor of each of the measurement signals, and determine, as the correction value, one of the preset values according to which the resulting modulation factors are substantially equal between two of the measurement signals indicative of time-varying amounts of light received on two of the light receiving areas located at two different positions along the radial direction of the optical disc.

When the light receiving areas are located at different positions along the radial direction of the optical disc and the modulation factors of two signals indicative of light received on the respective light receiving areas are equal to each other, it means that the center of the light receiving areas of the photodetector corresponds to the center line of the track. As a result, the reflected light received on the respective light receiving areas located relatively outwardly and inwardly is equal to each other in terms of the ratio between the high- and low-frequency components contained therein. Thus, by determining, as the correction value, the driving value of the focusing lens used when the resulting modulation factors are equal or substantially equal to each other, the positional deviation of the detecting elements are corrected before tracking control so as to bring the center of the light receiving areas of the photodetector to a position corresponding to the center line of the track. With this arrangement, the tracking control is performed with improved accuracy.

The preset values may be used by the lens drive to sequentially move the focusing lens by a predetermined amount along the radial direction of the optical disc.

With the above structure, the modulation factors are measured with different preset values. The preset values are used for sequentially moving the focusing lens along the radial direction of the optical disc to predetermined positions that are located at a predetermined space interval. This structure allows for easy setting of the preset value to be input next. In addition, an optimum driving value for moving the focusing lens along the radial direction of the optical disc is determined as the correction value. As a result, the accuracy of tracking control improves.

The correction value determining unit may be operable to (i) cause the optical head driving unit to sequentially move the optical head to a plurality of positions along the radial direction of the optical disc, (ii) sequentially input the preset values, each time the optical head is moved to a different one of the plurality of positions, for causing the lens drive to sequentially move the focusing lens to a plurality of radial positions of the optical disc while the optical head is located at the respective position, and (iii) determine a correction value based on measurement signals for each of the plurality of positions of the optical head. The tracking control unit may be operable to perform tracking control to bring the focusing lens to the position corresponding to the desired track, by inputting to the lens drive a sum of the control value and the correction value determined for one of the radial locations that is close to the desired track. The tracking control unit may be operable to obtain an average value of the correction values determined for the plurality of positions of the optical head and to input a sum of the average value and the correction value to the lens drive.

With the above structure, even if the optical disc has different characteristics at relatively inward and outward areas thereof, a correction value is determined for each of a plurality of radial positions on the optical disc, including for example, relatively inward and outward radial positions. Thus, the tracking control is more accurately performed as compared with tracking control performed based on a single correction value determined for a single radial position on the optical disc that is relatively away from the radial position of the desired track.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 2 illustrates the structure of a pickup included in the optical disc apparatus;

DESCRIPTION OF THE PREFERRED EMBODIMENT

Embodiment 1

<Overview>

Suppose that a detecting element deviates from a position corresponding to the center line of a desired track of an optical disc at the initial state before tracking control. Due to the positional deviation of the detecting element, the beam spot on the optical disc deviates from the center line of the track. In such a case, an optical disc apparatus according to the present invention determines a correction value for correcting the positional deviation based on measurement signals and sets a focusing lens drive to move a focusing lens according the correction value. Then, the optical disc apparatus corrects a TE signal based on the symmetry of the TE signal amplitude in a conventional manner and drives a tracking control circuit based on the corrected TE signal. The tracking control is performed based on a sum signal of the correction value and a control value, which is an output value of the tracking control circuit.

In the present embodiment, a TE signal is detected according to the push-pull method.

<Structure>

Figure 1:
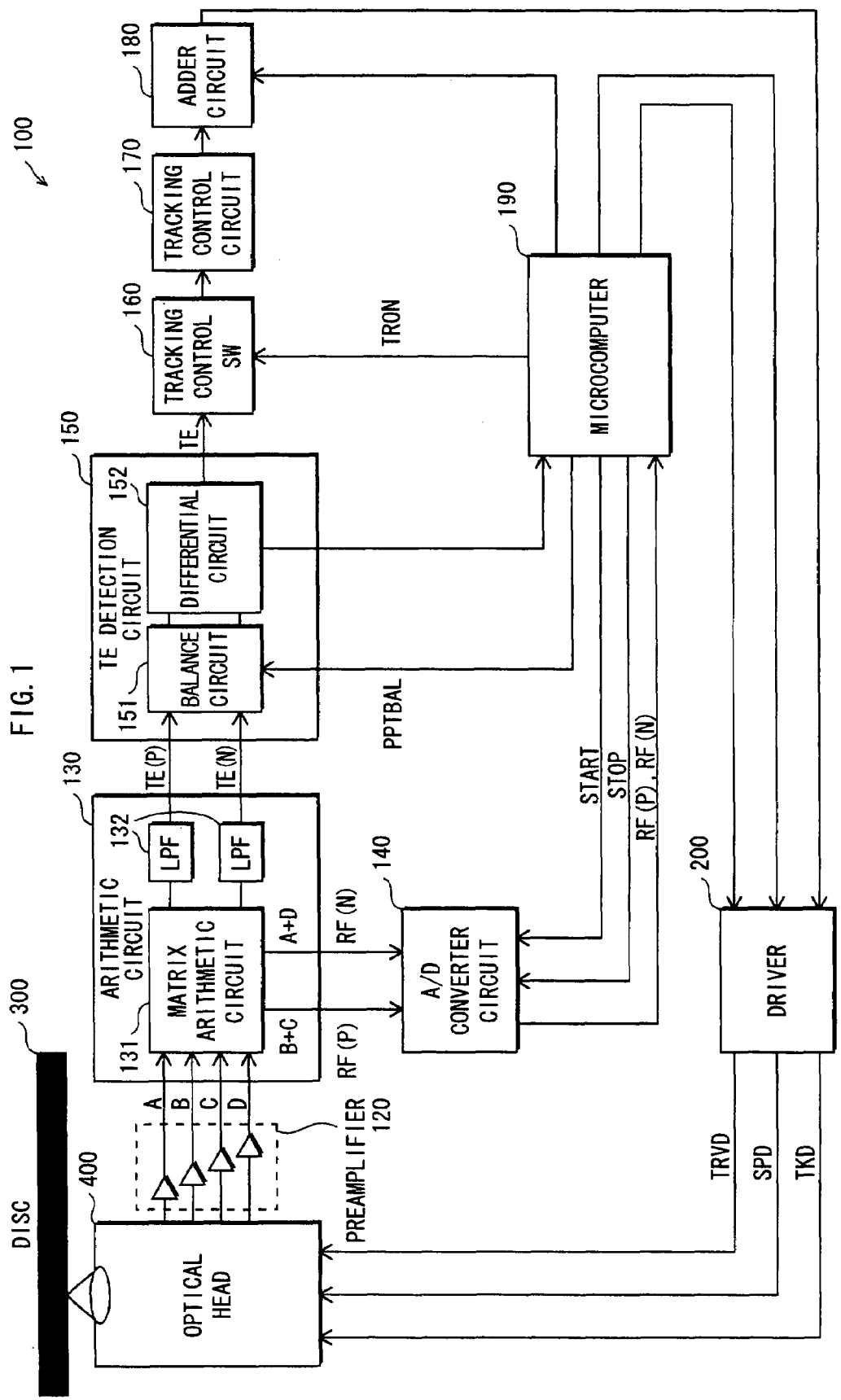
FIG. 1 illustrates the structure of an optical disc apparatus according to an embodiment of the present invention.

FIG. 1 illustrates the structure of an optical disc apparatus according to an embodiment 1 of the present invention.

As illustrated in FIG. 1, the optical disc apparatus 100 includes a pickup 110, a preamplifier 120, an arithmetic circuit 130, an A/D converter circuit 140, a TE detection circuit 150, a tracking control SW 160, a tracking control circuit 170, an adder circuit 180, a microcomputer 190, and a driver 200.

According to the embodiment 1, the lens drive mentioned above is realized by the adder circuit 180, the driver 200, and a tracking actuator 113. The photodetector is realized by an optical head 400 and the preamplifier 120. The optical head driving unit is realized by the microcomputer 190, the driver 200, and a transfer motor 112. The measurement signal generating unit is realized by the arithmetic circuit 130. The correction value determining unit is realized by the microcomputer 190. The tracking control unit is realized by the TE detection circuit 150, the tracking control SW 160, and the tracking control circuit 170.

Now, the following describes each element in detail.

FIG. 2 illustrates the structure of the optical head 400, along with a disc motor 111 and the transfer motor 112. The optical head 400 includes the tracking actuator 113, a light source 114, a coupling lens 115, a quadrant photodetector 116, a polarization beam splitter 117, a quarter wave plate 118, and a focusing lens 119.

The transfer motor 112 and the tracking actuator 113 adjust the incident position of a light beam on an optical disc 300.

The disc motor 111 rotates the optical disc 300. More specifically, the disc motor 111 rotates the optical disc 300 at a predetermined rotation speed in accordance with a control signal output from the micro computer 190. The control signal received from the microcomputer 190 is converted by the driver 200 into a driving current (or voltage) and supplied to the disc motor 111.

The transfer motor 112 shifts the optical head 400 along the radial direction of the optical disc 300. More specifically, the motor 112 shifts the optical head 400 to a position over a specific one of the tracks of the optical disc 300, in accordance with the control signal converted by the driver 200 into the driving current (or voltage) and supplied from the microcomputer 190.

The tracking actuator 113 includes, for example, a movable part having a tracking coil and a fixed part having a permanent magnet. The focusing lens 119 is attached to the movable part. By the action of the electromagnetic force generated responsively to the current flowing through the coil, the position of the permanent magnet is adjusted relative to the focusing lens 119, so that the incident position of the light beam on the optical disc 300 is shifted along the radial direction of the optical disc 300, i.e. in the direction traversing a plurality of tracks. The tracking actuator 113 drives the focusing lens 119 according to the driving current (or voltage). As stated above, the driving current (or voltage) is converted by driver 200 from the control signal generated by the tracking control circuit 170 and the adder circuit 180 under the control of the microcomputer 190.

The light source 114 emits a light beam toward the optical disc 300. The coupling lens 115 collimates the light beam into a parallel beam that travels toward the polarization beam splitter 117. The quarter wave plate 118 converts the light reflected from the polarization beam splitter 117 to circularly polarized light and guides the circularly polarized light to the optical disc 300 thorough the focusing lens 119.

The quadrant photodetector 116 has four areas A-D for receiving light reflected from the optical disc 300 and outputs the light received by the respective areas separately to the preamplifier 120.

Note that the light reflected from the optical disc 300 and detected by the quadrant photodetector 116 includes components used for generating signals for playback of data recorded on the optical disc 300, in addition to components used for TE signal generation.

The preamplifier 120 converts the amount of light received by each area of the quadrant photodetector 116 into a voltage of corresponding magnitude.

The arithmetic circuit 130 includes a matrix arithmetic circuit 131 and low pass filters 132.

The matrix arithmetic circuit 131 adds the voltage values indicative of the amounts of light received by the respective areas A-D of the quadrant photodetector 116 to obtain two signals (A+D) and (B+C). The obtained two signals are input to the respective low pass filters.

One of the signals corresponding to (A+D) is denoted as RF(P), whereas the other signal corresponding to (B+C) is denoted as RF(N).

Each low pass filter 132 cuts high-frequency components from the RF signal input thereto and passes a low-frequency signal mainly composed of low-frequency components. High-frequency components mainly represent changes in the light reflected from the pits as well as the recorded and non-recorded areas of the optical disc. On the other hand, low-frequency components mainly represent changes in the light reflected from the lands and grooves of the optical disc when the light beam traverses tracks in the radial direction. The low-frequency signal output upon receipt of RF(P) is denoted as TE(P), whereas the low-frequency signal output upon receipt of RF(N) is denoted as TE(N).

The A/D converter circuit 140 conducts A/D conversion separately on RF(P) and RF (N) signals received from the matrix arithmetic circuit 131. The A/D converted RF(P) and RF(N) signals are output to the microcomputer 190.

The TE detection circuit 150 includes a balance circuit 151 and a differential circuit 152. The TE detection circuit 150 corrects a TE signal under control by the microcomputer 190. The TE signal is generated from TE (P) and TE (N) signals received from the arithmetic circuit 130. The corrected TE signal is output to the tracking control SW 160. The following is a more detailed description of the TE detection circuit 150.

The balance circuit 151 multiplies each of TE(P) and TE(N) signals received from the arithmetic circuit 130, by a predetermined gain (constant). The result of each multiplication is output to the differential circuit 152.

The TE signal output from the differential circuit 152 involves an electrical offset generated in each circuit during the time lapsed until TE(P) and TE(N) signals output from the preamplifier 120 reach the TE detection circuit 150. In order to correct the offset, the TE detection circuit 150 receives a gain (which is a constant) determined in advance for TE(P) and TE(N) signals from the microcomputer 190. The TE detection circuit 150 then multiplies each of TE(P) and TE(N) signals by the received gain and outputs the signals obtained as a result of multiplication to the differential circuit 152.

The differential circuit 152 outputs a TE signal representing the difference between TE(P) and TE(N) signals that are input from the balance circuit 151. In addition, the differential circuit 152 outputs the maximum value (TE$_{max}$) and the minimum value (TE$_{min}$) of the resulting TE signal to the microcomputer 190.

In accordance with instructions given from the microcomputer 190, the tracking control SW 160 activates and suspends the tracking control circuit 170.

To be more specific, the tracking control circuit 170 is realized by a digital filter with phase compensation. When activated by the tracking control SW 160, the tracking control circuit 170 sequentially generates and outputs a driving signal according which the tracking actuator 113 is so driven that the resulting TE signal would coincide with the reference potential.

The adder circuit 180 adds the value of driving signal that is received from the tracking control circuit 170 to the value of TR-driving offset signal received from the microcomputer 190. The adder circuit 180 then outputs the addition result as a driving signal to the driver 200. The details of the TR-driving offset signal will be given later.

The microcomputer 190 calculates, in a conventional manner, such a gain (constant) for each of TE(P) and TE(N) that would make the TE signal amplitude symmetrical about the reference potential. More specifically, the microcomputer 190 calculates such a gain based on TE$_{max}$ and TE$_{min}$, which are the maximum and minimum values of the TE signal output from the TE detection circuit 150.

Under the state where tracking control is OFF, the symmetry of TE signal is expressed as follows.

$$TE\ \text{Symmetry} = (|TE_{max}| - |TE_{min}|)/(|TE_{max}| + |TE_{min}|)$$

The TE signal is symmetrical when the value of TE symmetry is minimum. Thus, the microcomputer 190 calculates the gain (constant) of TE(P) and TE(N) so as to make the TE symmetry a minimum value.

In addition, the microcomputer 190 calculates the modulation factor of each RF signal having been A/D converted by the A/D converter circuit 140. The microcomputer 190 then measures such a driving value of the focusing lens 119 (hereinafter, "TR-driving offset") that would keep the difference between the modulation factors of RF(P) and RF(N) to a minimum and determines the thus measured TR-driving offset as a correction value for correcting the TE signal deviation.

Figure 3A:
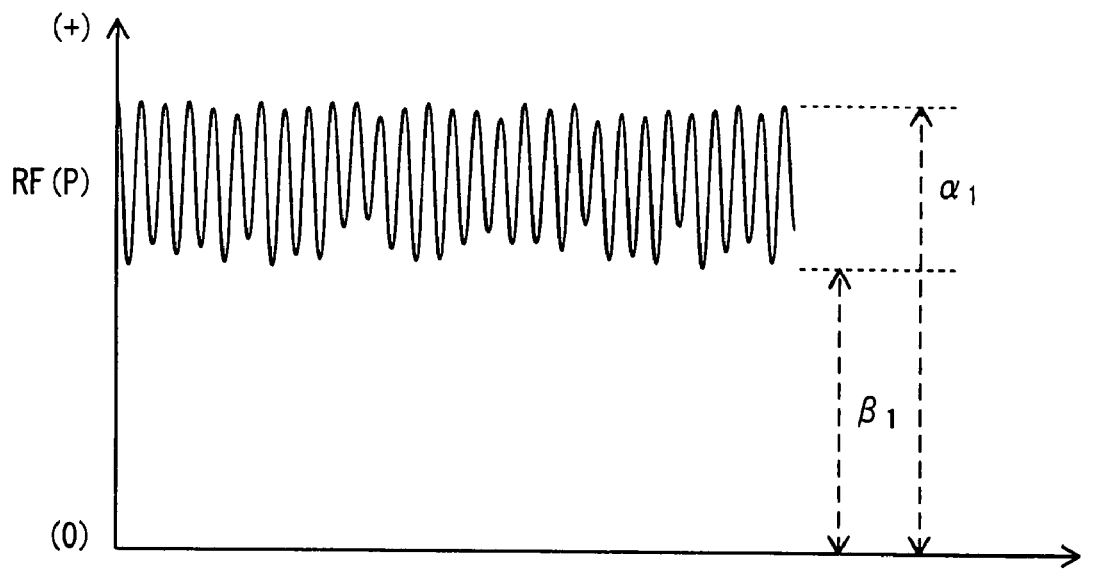
FIG. 3A illustrates the waveform and modulation factor of RF(P) signal.
Figure 3B:
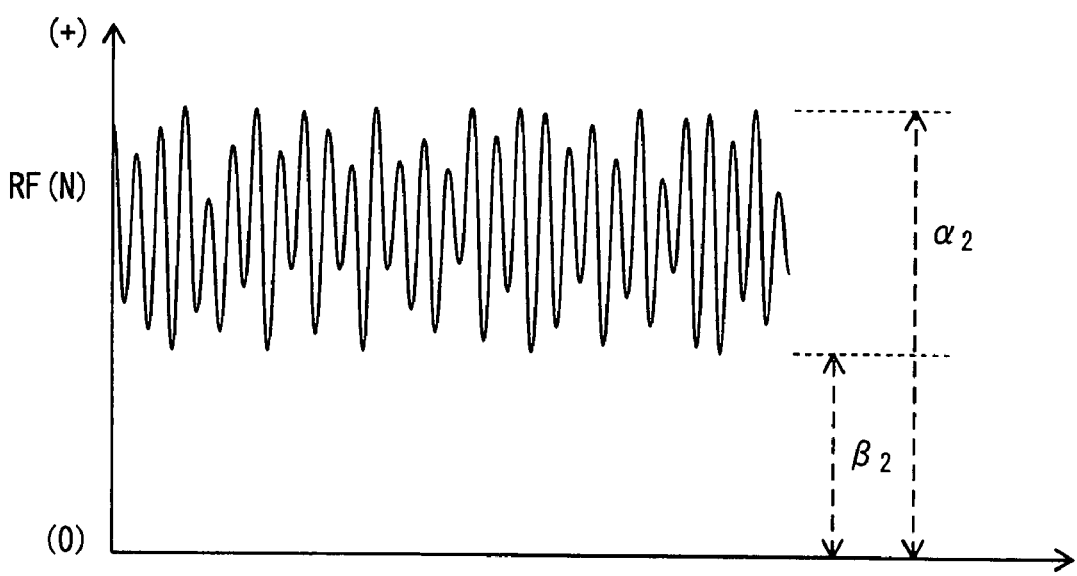
FIG. 3B illustrates the waveform and modulation factor of RF(N) signal.

Suppose that the RF(N) signal and RF(P) signal each have the waveform as illustrated in FIGS. 3. In this case, the modulation factor of each RF signal is expressed, for example, as follows.

$$\text{Modulation Factor (\%)} = (\alpha - \beta)/\beta 100,$$

where $\alpha$ is the maximum amplitude of TE signal, and $\beta$ is the minimum amplitude of TE signal.

Further, the microcomputer 190 supplies the thus determined TR-driving offset to the adder circuit 180 and the gain for correcting TE signal deviation to the balance circuit 151. Thereafter, the microcomputer 190 instructs the tracking control SW 160 to execute tracking control.

The driver 200 operates under control of the microcomputer 190. More specifically, the driver converts a control signal into a driving current (or voltage). Here, the control signal is a sum of the control value output from the tracking control circuit 170 and the correction value set in the adder circuit 180. The resulting driving current is output to the tracking actuator 113. In addition, the driver 200 receives two control signals output from the microcomputer 190. One of the control signals is for controlling rotation of the disc motor 111, and the other is for driving the transfer motor 112. The driver 200 converts each control signal into a driving current (or voltage) and output the resulting driving currents to the respective one of the disc motor 111 and the disc motor 111.

<Operation>

The following describes operation of the optical disc apparatus 100 having the above structure.

Figure 4:
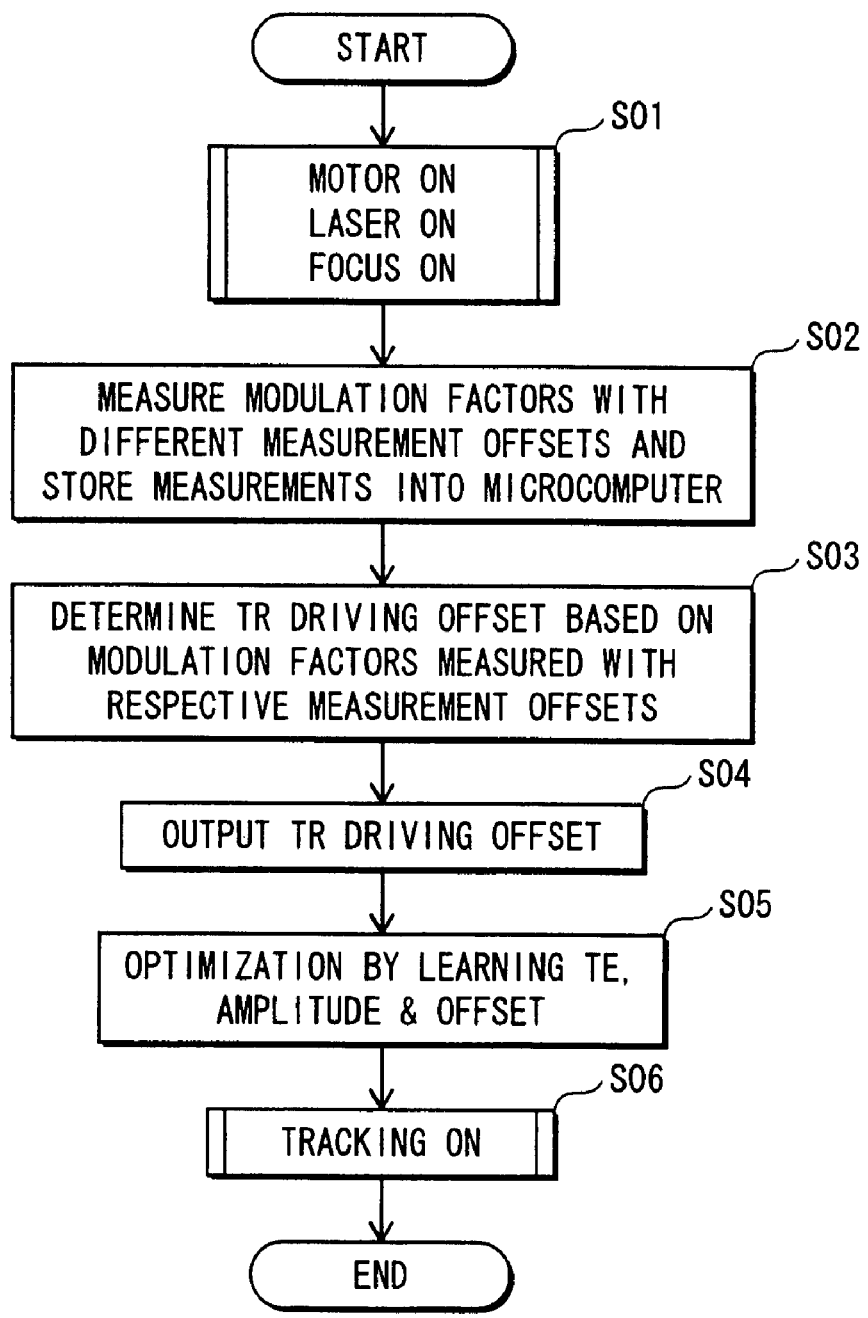
FIG. 4 is a flowchart showing operation of the optical disc apparatus for determining a TR-driving offset.

FIG. 4 is a flowchart showing operation of the optical disc apparatus 100 for determining a TR-driving offset before initiating tracking control. The TR-driving offset is used for tracking control.

Note that the present embodiment assumes that the TR-driving off set is calculated for tracking control to follow a relatively inner track of the optical disc 300. The microcomputer 190 thus causes the transfer motor 112 to transfer the overall optical head 400 to the position corresponding to the inner track. The microcomputer 190 then sequentially increments the measurement offset held in the adder circuit 180 by the predetermined amount. As a result, the focusing lens 119 is sequentially moved radially outwardly of the optical disc 300 by a predetermined travel amount (for example 10 µm). The microcomputer 190 calculates a difference in modulation factor between a pair of RF signals measured for each of the measurement offsets. The microcomputer 190 determines, as the TR-driving offset for correcting the driving value used in tracking control, the measurement offset according to which the difference between the modulation factors of the pair of RF signals becomes smallest. The thus determined TR-driving offset is used to correct the driving value for tracking control.

The following description is given with reference to the flowchart.

In Step S01 shown in the flowchart, the microcomputer 190 of the optical disc apparatus 100 activates the disc motor 111, causes the light source 114 to emit a light beam, and control focusing of the light beam with the focusing lens 119.

In Step S02, under the state in which the optical head 400 is positioned at the inner track of the optical disc 300, the microcomputer 190 sets the measurement offsets to the adder circuit 180, so that the focusing lens 119 is moved radially of the optical disc sequentially in accordance with the respective measurement offsets. In addition, the microcomputer 190 activates the A/D converter circuit 140 to start the modulation factor measurement.

The matrix arithmetic circuit 131 adds the RF signals output from the respective areas A-D of the quadrant photodetector 116 in a manner to obtain a pair of RF(P) and RF(N) signals. The RF(P) signal is the sum of signals output from the areas B and C, whereas the RF(N) signal is the sum of signals output from the areas A and D. The resulting pair of RF(P) and RF(N) signals are output to the A/D converter circuit 140. The A/D converter circuit 140 conducts A/D conversion on the input RF(P) signal and RF(N) signal separately and outputs the resulting digital RF(P) and RF(N) signals to the microcomputer 190. A pair of RF(P) and RF(N) signals is measured for each of the plurality of measurement offsets.

Next, the microcomputer 190 calculates modulation factors of each RF(P) and RF(N) signals received from the A/D converter circuit 140 and stores into memory or the like the respective modulation factors in pairs correspondingly to the respective measurement offsets.

In Step S03, the microcomputer 190 reads the pairs of modulation factors stored in Step S02 correspondingly to the respective measurement offsets. The microcomputer 190 determines, as a TR-driving offset, one of the measurement offsets corresponding to a pair of modulation factors of which difference is smallest among all the differences between each pair of modulation factors.

In Step S04, the microcomputer 190 outputs, to the adder circuit 180, the TR-driving offset determined after the modulation factor measurement is finished for all the measurement offsets.

In Step S05, the TE detection circuit 150 outputs the maximum value $TE_{max}$ and the minimum value $TE_{min}$ of TE signal to the microcomputer 190. The microcomputer 190 then calculates, based on $TE_{max}$ and $TE_{min}$, a gain that would make the TE signal symmetrical and outputs the calculated gain to the balance circuit 151. The balance circuit 151 multiples each of TE(P) and TE (N) by the input gain. The differential circuit 152 outputs a TE signal representing the difference between the multiplied TE(P) and TE(N).

In Step S06, the microcomputer 190 turns the tracking control SW 160 ON to activate the tracking control circuit 170. The tracking control circuit 170 starts to output a driving value that is for controlling the tracking actuator 113 in a manner to cause the resulting TE signal to coincide with the reference potential. The adder circuit 180 adds the TR-driving offset that is determined by the microcomputer 190 in Step S04 and the driving signal that is received from the tracking control circuit 170. The addition result is output to the driver 200.

As has been described above, the optical disc apparatus according to the present invention corrects the deviation of the TE signal amplitude center that is caused as a result of the positional deviation of the detecting elements from the centerline of the track before initiating tracking control at the initial state before tracking control is performed. The correction is made with reference to the modulation factors of RF signals each containing high-frequency components detected by the photodetector.

Consequently, the optical disc apparatus according to the present invention is applicable to tracking control of optical discs including DVD-RAM and capable of duly correcting the deviation of the TE signal amplitude center from the center line of the track. This is achieved despite the fact that such an optical disc has the characteristic that makes it difficult to detect the TE signal deviation based only on the TS signal symmetry. More specifically, the optical disc apparatus according to the present invention sets the focusing lens drive to move the focusing lens in accordance with the TR-driving offset, which is a value determined to correct the positional deviation of the focusing lens from the center line of the track. After the focusing lens is moved, the optical disc apparatus corrects the TE signal based on the symmetry of its amplitude in a conventional manner. The optical disc apparatus then drives the tracking control circuit based on the corrected TE signal. Finally, the optical disc apparatus performs tracking control based on the sum signal of the control value, which is an output of the tracking control circuit, and the TR-driving offset. In this manner, the accuracy of tracking control improves as compared with a conventional technique.

<Supplemental Note>

The present invention has been described by way of the above embodiment. It is naturally appreciated, however, that the present invention is not limited to the specific embodiment described above and various modifications including the following still falls within the scope of the present invention.

(1) According to the embodiment described above, the RF signals detected from the respective areas A-D of the quadrant photodetector 116 are added to obtain RF(N), which is the sum of signals output from the areas A and D, and RF(P), which is the sum of signals output from the areas C and C.

Figure 5:
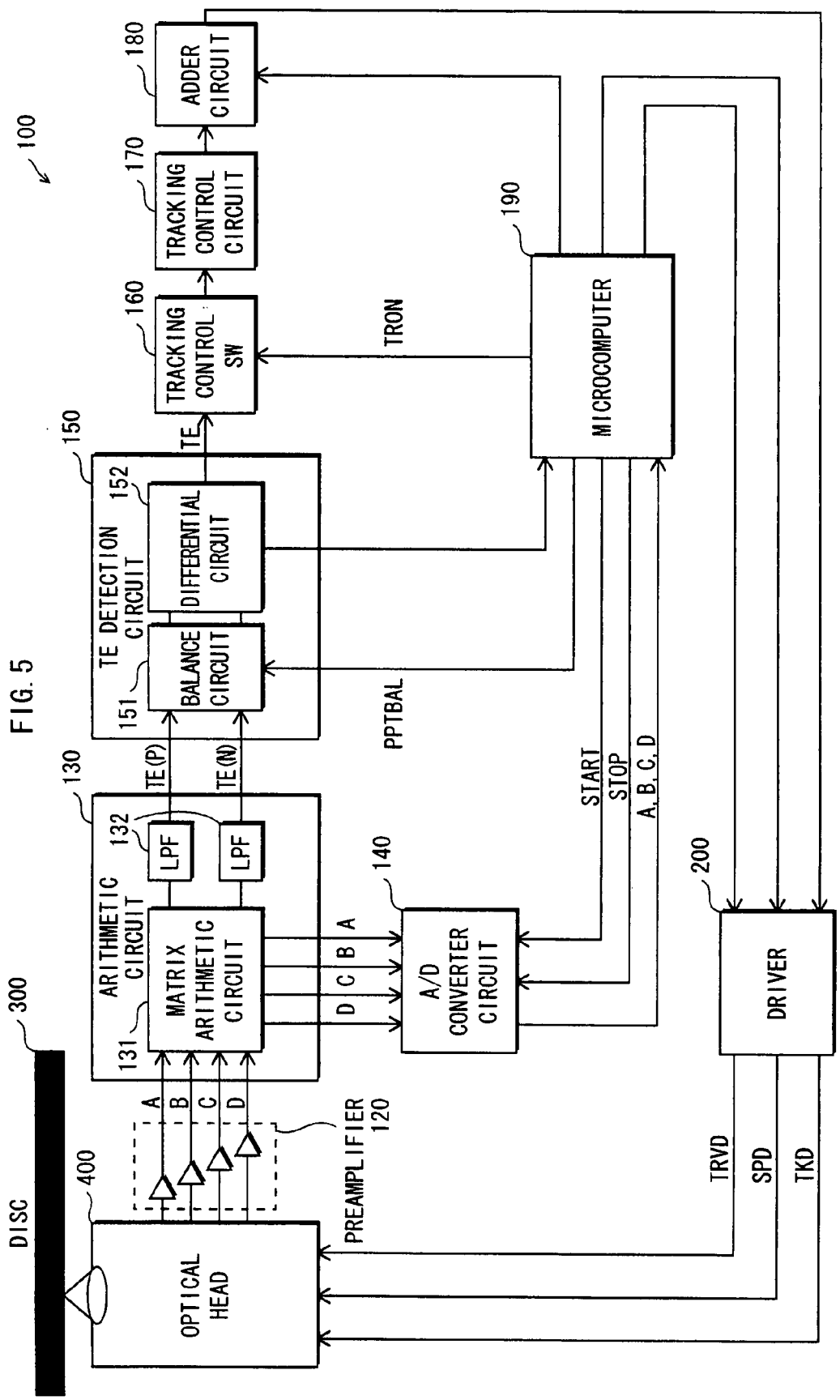
FIG. 5 illustrates the structure of an optical disc apparatus according to a modification of the present invention.
Figure 6:
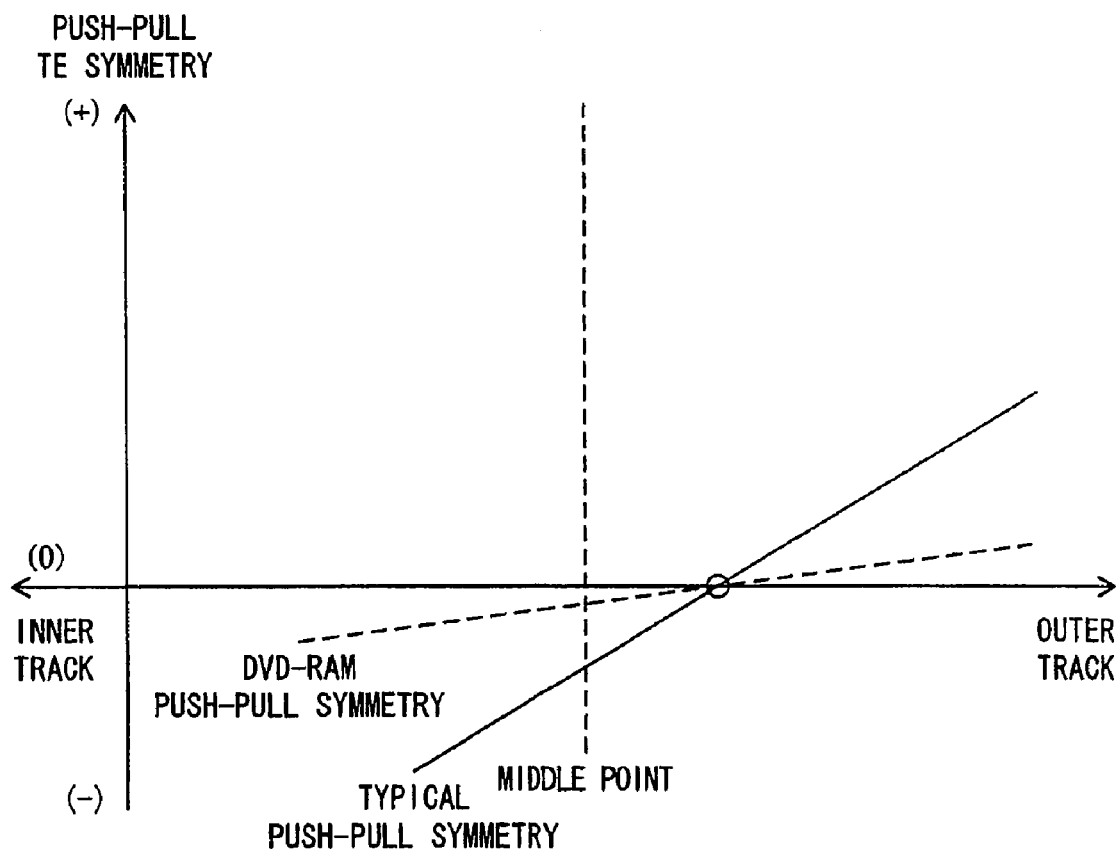
FIG. 6 illustrates the TE signal symmetry of a DVD-RAM and of an optical disc other than DVD-RAM.
Figure 7A:
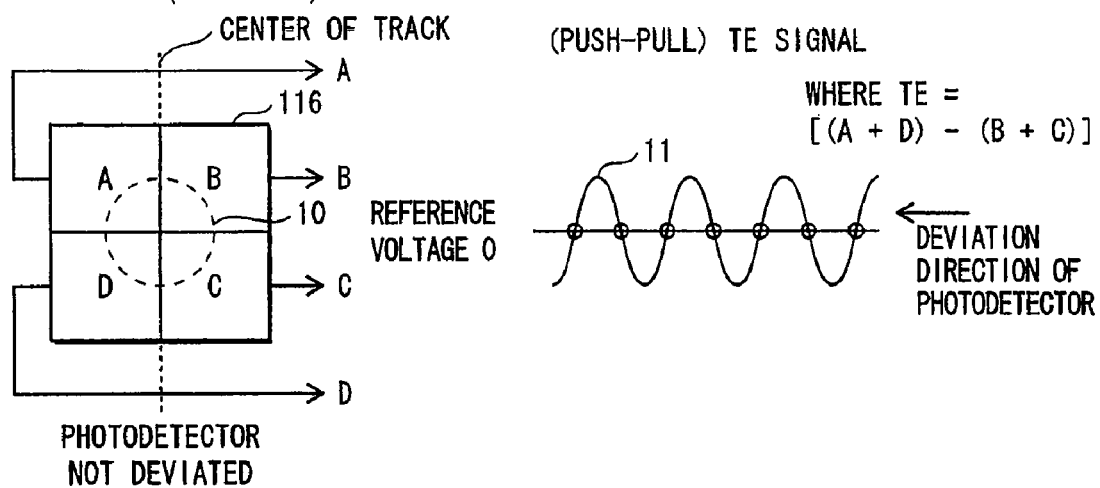
FIG. 7A illustrates a reference voltage and a TE signal in the case where a quadrant photodetector does not deviate.
Figure 7B:
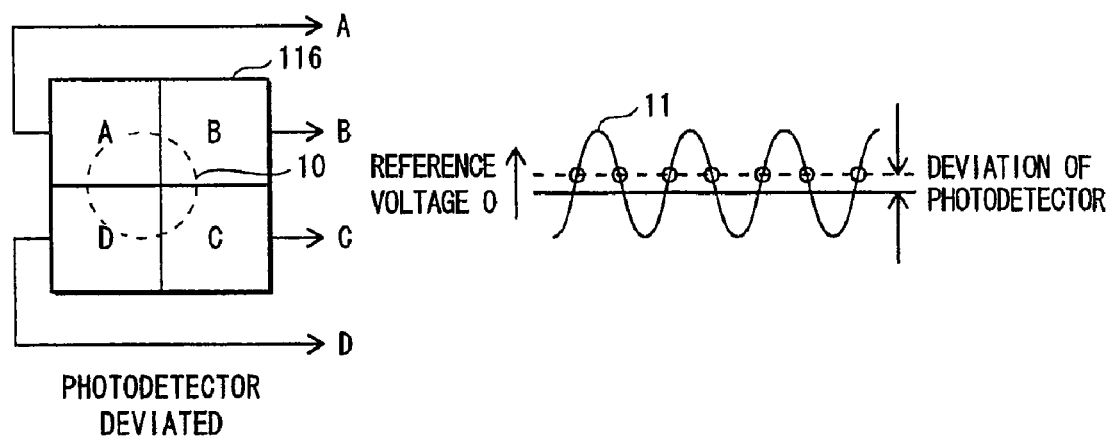
FIG. 7B illustrates a reference voltage and a TE signal in the case where the quadrant photodetector deviates inwardly of the optical disc.
Figure 7C:
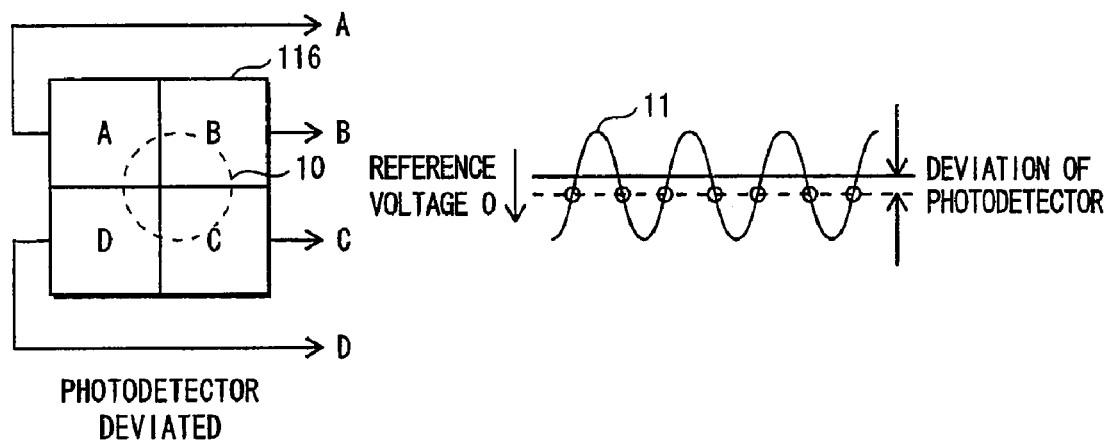
FIG. 7C illustrates a reference voltage and a TE signal in the case where the quadrant photodetector deviates outwardly of the optical disc.

Then, the modulation factors of the respective RF signals are calculated. Alternatively, however, it is applicable, as illustrated in FIG. 5, that the arithmetic circuit 130 separately outputs the RF signals measured in the respective areas A-D to the A/D converter circuit 140. In this case, the microcomputer 190 calculates a modulation factor of each of four RF signals having been A/D converted by the A/D converter circuit 140. The microcomputer 190 then calculates a difference in modulation factor between each pair of measurement signals output from the areas A and B to determine a driving value according to which the resulting difference is smallest. Similarly, the microcomputer 190 calculates a difference in modulation factor between each pair of measurement signals output from the areas C and D to determine a driving value according to which the resulting difference is smallest. The microcomputer 190 then calculates an average of the two driving values and determines the average as the TR-driving offset.

(2) Further, although the embodiment described above employs the quadrant photodetector, the present invention may alternatively employ a photodetector having two light receiving areas corresponding to mutually different radial positions of a track.

(3) Still further, according to the above embodiment, the TR-driving offset is determined for one arbitrary radial position on the optical disc. Alternatively, however, it is applicable to determine a TR-driving offset for each of a plurality of radial positions on the optical disc. To this end, the optical disc apparatus calculates modulation factors of signals that are measured at each of the plurality of radial positions while varying the measurement offsets. As a result, the optical disc apparatus determines a plurality of TR-driving offsets each of which corresponds to a different one of the plurality of radial positions on the optical disc.

When performing the tracking control, in this case, the microcomputer 190 outputs, to the adder circuit 180, the TR-driving offsets used in the signal measurements at the plurality of radial positions on the optical disc. Tracking control for causing the optical beam to follow a desired one of the tracks of the optical disc is performed by selectively using one of the TR-driving offsets that is determined for a radial position close to the desired track.

In addition, the microcomputer 190 may determine, as the final TR-driving offset to be used for tracking control, the average of the plurality of TR-driving offsets determined for the plurality of the radial positions of the optical disc. The average is expressed as follows.

AVERAGE(*TKDOFS*(1)+*TKDOFS*(2)+ . . . +*TKD-OFS*(*n*))

Still further, it is applicable to calculate variations of the respective measurements from the average TR driving offset (AVERAGE). The final TR driving offset may be determined by multiplying the average TR driving offset (AVERAGE) by the variations.

In this case, the following expressions are given.

$$\sigma = k \times \sum [TKDOFS(1) + TKDOFS(2) + \ldots + TKDOFS(n)]$$

$$TKDOFS = AVERAGE \begin{pmatrix} TKDOFS(1) + \\ TKDOFS(2) + \ldots + \\ TKDOFS(n) \end{pmatrix} \times (1 - \sigma)$$

where TKDOFS denotes a TR driving offset determined for one of the tracks, n denotes the number of measurements, (1−σ) denotes the variation amount of the measurements, and k denotes the reliability of the average.

(4) According to the above embodiment, the RF signal is detected using the push-pull method. Alternatively, however, the phase difference method or the thee beam method may be employed as well.

(5) According to the above embodiment, the modulation factor is given by the following expression.

$$\text{Modulation Factor } (\%) = (\alpha - \beta)/\beta \times 100$$

Alternatively, however, the modulation factor may be given by any of the following expressions.

$$\text{Modulation Factor } (\%) = ((\alpha - \beta)/\alpha \times 100$$

$$\text{Modulation Factor } (\%) = (\alpha - \beta)/(\alpha + \beta) \times 100$$

(6) The present invention maybe practiced as a computer program for causing a computer system to carry out the operation of determining the TR driving offset as described in the above embodiment.

(7) Still further, although the above embodiment relates the optical disc apparatus, the present invention may be practiced as an integrated circuit for carrying out the operation described in the above embodiment.

INDUSTRIAL APPLICABILITY

The optical disc apparatus according to the present invention is usable as a playback apparatus and recording/playback apparatus for CD-ROMs and other discs.

What is claimed is:

1. An optical disc apparatus for accessing a desired one of a plurality of tracks on an optical disc, comprising:
   an optical head including:
      a light source operable to emit a light beam;
      a focusing lens operable to focus the light beam onto the optical disc;
      a photodetector having a plurality of light receiving areas and operable to successively receive the light beam reflected from the optical disc; and
      a lens drive operable to move the focusing lens along a radial direction of the optical disc, in accordance with input to the lens drive;
   an optical head driving unit operable to move the optical head along the radial direction of the optical disc, in accordance with input to the optical head driving unit;
   a measurement signal generating unit operable to generate measurement signals each indicative of a time-varying amount of light received on a respective one of the light receiving areas, the light being the light beam emitted by the optical head and reflected from different radial positions on the optical disc being rotated;
   a correction value determining unit operable, before tracking control, to (i) sequentially input, to the lens drive, preset values each determined in advance for moving the focusing lens, thereby causing the focusing lens to be sequentially moved in accordance with the preset values to a plurality of positions along the radial direction of the optical disc, and (ii) determine a correction value based on a difference between measurement signals in terms of predetermined low- and high-frequency components, the measurement signals being generated by the measurement signal generating unit as a result that the focusing lens is sequentially moved in accordance with the respective preset values; and
   a tracking control unit operable to perform tracking control after the correction value determining unit determines the correction value, by inputting to the lens drive unit a sum of the determined correction value and a control value determined for moving the focusing lens to a position corresponding to the desired track.

2. An optical disc apparatus for accessing a desired one of a plurality of tracks on an optical disc, comprising:
   an optical head including:
      a light source operable to emit a light beam;
      a focusing lens operable to focus the light beam onto the optical disc;
      a photodetector having a plurality of light receiving areas and operable to successively receive the light beam reflected from the optical disc; and
      a lens drive operable to move the focusing lens along a radial direction of the optical disc, in accordance with input to the lens drive;
   an optical head driving unit operable to move the optical head along the radial direction of the optical disc, in accordance with input to the optical head driving unit;
   a measurement signal generating unit operable to generate measurement signals each indicative of a time-varying amount of light received on a respective one of the light receiving areas, the light being the light beam emitted by the optical head and reflected from different radial positions on the optical disc being rotated;
   a correction value determining unit operable, before tracking control, to (i) sequentially input, to the lens drive, preset values each determined in advance for moving the focusing lens, thereby causing the focusing lens to be sequentially moved in accordance with the preset values to a plurality of positions along the radial direction of the optical disc, (ii) measure a modulation factor of each of a plurality of measurement signals generated by the measurement signal generating unit as a result that the focusing lens is sequentially moved in accordance with the respective preset values, and (iii) determine, as a correction value, one of the preset values according to which the resulting modulation factors are substantially equal between two of the measurement signals indicative of time-varying amounts of light received on two of the light receiving areas located at two different positions along the radial direction of the optical disc; and
   a tracking control unit operable to perform tracking control after the correction value determining unit determines the correction value, by inputting to the lens drive unit a sum of the determined correction value and a control value determined for moving the focusing lens to a position corresponding to the desired track.

3. The optical disc apparatus according to claim 1, wherein the correction value determining unit is operable to measure a modulation factor of each of the measurement signals, and determine, as the correction value, one of the preset values according to which the resulting modulation factors are substantially equal between two of the measurement signals indicative of time-varying amounts of light received on two of the light receiving areas located at two different positions along the radial direction of the optical disc.

4. The optical disc apparatus according to claim 1, wherein the preset values are used by the lens drive to sequentially move the focusing lens by a predetermined amount along the radial direction of the optical disc.

5. The optical disc apparatus according to claim 2, wherein the preset values are used by the lens drive to sequentially move the focusing lens by a predetermined amount along the radial direction of the optical disc.

6. The optical disc apparatus according to claim 1, wherein the tracking control unit, is operable to (i) detect a positional deviation of the light beam from the desired track based on the measurement signals using a push-pull method, (ii) set a target position relative to the desired track based on the detected deviation, and (iii) update the control value so as to cause the light beam to follow the target position.

7. The optical disc apparatus according to claim 2, wherein the tracking control unit is operable to (i) detect a positional deviation of the light beam from the desired track based on the measurement signals using a push-pull method, (ii) set a target position relative to the desired track based on the detected deviation, and (iii) update the control value so as to cause the light beam to follow the target position.

8. The optical disc apparatus according to claim 1, wherein the correction value determining unit is operable to (i) cause the optical head driving unit to sequentially move the optical head to a plurality of positions along the radial direction of the optical disc, (ii) sequentially input the preset values, each time the optical head is moved to a different one of the plurality of positions, for causing the lens drive to sequentially move the focusing lens to a plurality of radial positions of the optical disc while the optical head is located at the respective position, and (iii) determine a correction value based on measurement signals for each of the plurality of positions of the optical head, and
the tracking control unit is operable to perform tracking control to bring the focusing lens to the position corresponding to the desired track, by inputting to the lens drive a sum of the control value and the correction value determined for one of the radial locations that is close to the desired track.

9. The optical disc apparatus according to claim 2, wherein the correction value determining unit is operable to (i) cause the optical head driving unit to sequentially move the optical head to a plurality of positions along the radial direction of the optical disc, (ii) sequentially input the preset values, each time the optical head is moved to a different one of the plurality of positions, for causing the lens drive to sequentially move the focusing lens to a plurality of radial positions of the optical disc while the optical head is located at the respective position, and (iii) determine a correction value based on measurement signals for each of the plurality of positions of the optical head, and
the tracking control unit is operable to perform tracking control to bring the focusing lens to the position corresponding to the desired track, by inputting to the lens drive a sum of the control value and the correction value determined for one of the radial locations that is close to the desired track.

10. The optical disc apparatus according to claim 8, wherein
the tracking control unit is operable to obtain an average value of the correction values determined for the plurality of positions of the optical head and to input a sum of the average value and the correction value to the lens drive.

11. The optical disc apparatus according to claim 9, wherein
the tracking control module is operable to obtain an average value of the correction values determined for the plurality of positions of the optical head and to input a sum of the average value and the correction value to the lens drive.

12. An integrated circuit for an optical disc apparatus that accesses a desired one of tracks on an optical disc,
the optical disc apparatus having:
a lens driving unit operable to move a focusing lens along a radial direction of the optical disc, in accordance with input to the lens driving unit; and
an optical head driving unit operable to move an optical head along the radial direction of the optical disc, in accordance with input to the optical head driving unit,
the optical disc apparatus receiving light with a plurality of light receiving areas, the light received by the respective light receiving areas being a light beam emitted by the optical head and reflected from different radial positions on the optical disc being rotated,
the integrated circuit comprising:
a measurement signal generating module operable to generate measurement signals each indicative of a time-varying amount of light received on a respective one of the light receiving areas;
a correction value determining module operable, before tracking control, to (i) sequentially input, to the lens driving unit, preset values each determined in advance for moving the focusing lens, thereby causing the focusing lens to be sequentially moved in accordance with the preset values to a plurality of positions along the radial direction of the optical disc, and (ii) determine a correction value based on a difference between measurement signals in terms of predetermined low- and high-frequency components, the measurement signals being generated by the measurement signal generating module as a result that the focusing lens is sequentially moved in accordance with the respective preset values; and
a tracking control module operable to perform tracking control after the correction value determining module determines the correction value, by inputting to the lens drive unit a sum of the determined correction value and a control value determined for moving the focusing lens to a position corresponding to the desired track.

13. An integrated circuit for an optical disc apparatus that accesses a desired one of tracks on an optical disc,
the optical disc apparatus having:
a lens driving unit operable to move a focusing lens along a radial direction of the optical disc, in accordance with input to the lens driving unit; and
an optical head driving unit operable to move an optical head along the radial direction of the optical disc, in accordance with input to the optical head driving unit,
the optical disc apparatus receiving light with a plurality of light receiving areas, the light received by the respective light receiving areas being a light beam emitted by the optical head and reflected from different radial positions on the optical disc being rotated,
the integrated circuit comprising:
a measurement signal generating module operable to generate measurement signals each indicative of a time-varying amount of light received on a respective one of the light receiving areas;

a correction value determining module operable, before tracking control, to (i) sequentially input, to the lens drive, preset values each determined in advance for moving the focusing lens, thereby causing the focusing lens to be sequentially moved in accordance with the preset values to a plurality of positions along the radial direction of the optical disc, (ii) measure a modulation factor of each of a plurality of, measurement signals generated by the measurement signal generating module as a result that the focusing lens is sequentially moved in accordance with the respective preset values, and (iii) determine, as a correction value, one of the preset values according to which the resulting modulation factors are substantially equal between two of the measurement signals indicative of time-varying amounts of light received on two of the light receiving areas located at two different positions along the radial direction of the optical disc; and a tracking control module operable to perform tracking control after the correction value determining module determines the correction value, by inputting to the lens drive unit a sum of the determined correction value and a control value determined for moving the focusing lens to a position corresponding to the desired track.

14. An optical disc apparatus system for accessing a desired one of a plurality of tracks on an optical disc, comprising:

an optical head including:
a light source operable to emit a light beam;
a focusing lens operable to focus the light beam onto the optical disc;
a photodetector having a plurality of light receiving areas and operable to successively receive the light beam reflected from the optical disc; and
a lens drive operable to move the focusing lens along a radial direction of the optical disc, in accordance with input to the lens drive;

an optical head driving unit operable to move the optical head along the radial direction of the optical disc, in accordance with input to the optical head driving unit;

a measurement signal generating unit operable to generate measurement signals each indicative of a time-varying amount of light received on a respective one of the light receiving areas, the light being the light beam emitted by the optical head and reflected from different radial positions on the optical disc being rotated;

a correction value determining unit operable, before tracking control, to (i) sequentially input, to the lens drive, preset values each determined in advance for moving the focusing lens, thereby causing the focusing lens to be sequentially moved in accordance with the preset values to a plurality of positions along the radial direction of the optical disc, and (ii) determine a correction value based on a difference between measurement signals in terms of predetermined low- and high-frequency components, the measurement signals being generated by the measurement signal generating unit as a result that the focusing lens is sequentially moved in accordance with the respective preset values; and a tracking control unit operable to perform tracking control after the correction value determining unit determines the correction value, by inputting to the lens drive unit a sum of the determined correction value and a control value determined for moving the focusing lens to a position corresponding to the desired track.

15. An optical disc apparatus system for accessing a desired one of a plurality of tracks on an optical disc, comprising:

an optical head including:
a light source operable to emit a light beam;
a focusing lens operable to focus the light beam onto the optical disc;
a photodetector having a plurality of light receiving areas and operable to successively receive the light beam reflected from the optical disc; and
a lens drive operable to move the focusing lens along a radial direction of the optical disc, in accordance with input to the lens drive;

an optical head driving unit operable to move the optical head along the radial direction of the optical disc, in accordance with input to the optical head driving unit;

a measurement signal generating unit operable to generate measurement signals each indicative of a time-varying amount of light received on a respective one of the light receiving areas, the light being the light beam emitted by the optical head and reflected from different radial positions on the optical disc being rotated;

a correction value determining unit operable, before tracking control, to (i) sequentially input, to the lens drive, preset values each determined in advance for moving the focusing lens, thereby causing the focusing lens to be sequentially moved in accordance with the preset values to a plurality of positions along the radial direction of the optical disc, (ii) measure a modulation factor of each of a plurality of measurement signals generated by the measurement signal generating unit as a result that the focusing lens is sequentially moved in accordance with the respective preset values, and (iii) determine, as a correction value, one of the preset values according to which the resulting modulation factors are substantially equal between two of the measurement signals indicative of time-varying amounts of light received on two of the light receiving areas located at two different positions along the radial direction of the optical disc; and a tracking control unit operable to perform tracking control after the correction value determining unit determines the correction value, by inputting to the lens drive unit a sum of the determined correction value and a control value determined for moving the focusing lens to a position corresponding to the desired track.

16. A tracking control method for accessing a desired one of a plurality of tracks on an optical disc, by using:

an optical head including:
a light source operable to emit a light beam;
a focusing lens operable to focus the light beam onto the optical disc;
a photodetector having a plurality of light receiving areas and operable to successively receive the light beam reflected from the optical disc; and
a lens drive operable to move the focusing lens along a radial direction of the optical disc, in accordance with input to the lens drive; and an optical head driving unit operable to move the optical head along the radial direction of the optical disc, in accordance with input to the optical head driving unit, the method comprising:

a measurement signal generating step of generating measurement signals each indicative of a time-varying amount of light received on a respective one of the light receiving areas, the light being the light beam emitted by the optical head and reflected from different radial positions on the optical disc being rotated;

a correction value determining step of, before tracking control, (i) sequentially inputting, to the lens drive, preset values each determined in advance for moving the focusing lens, thereby causing the focusing lens to be sequentially moved in accordance with the preset values to a plurality of positions along the radial direction of the optical disc, and (ii) determining a correction value based on a difference between measurement signals in terms of predetermined low- and high-frequency components, the measurement signals being generated in the measurement signal generating step as a result that the focusing lens is sequentially moved in accordance with the respective preset values; and a tracking control step of performing tracking control after the correction value is determined in the correction value determining step, by inputting to the lens drive unit a sum of the determined correction value and a control value determined for moving the focusing lens to a position corresponding to the desired track.

17. A tracking control method for accessing a desired one of a plurality of tracks on an optical disc, by using:

an optical head including:
- a light source operable to emit a light beam;
- a focusing lens operable to focus the light beam onto the optical disc;
- a photodetector having a plurality of light receiving areas and operable to successively receive the light beam reflected from the optical disc; and
- a lens drive operable to move the focusing lens along a radial direction of the optical disc, in accordance with input to the lens drive;

an optical head driving unit operable to move the optical head along the radial direction of the optical disc, in accordance with input to the optical head driving unit;

the method comprising:

a measurement signal generating step of generating measurement signals each indicative of a time-varying amount of light received on a respective one of the light receiving areas, the light being the light beam emitted by the optical head and reflected from different radial positions on the optical disc being rotated;

a correction value determining step of, before tracking control, (i) sequentially inputting, to the lens drive, preset values each determined in advance for moving the focusing lens, thereby causing the focusing lens to be sequentially moved in accordance with the preset values to a plurality of positions along the radial direction of the optical disc, (ii) measuring a modulation factor of each of a plurality of measurement signals generated in the measurement signal generating step as a result that the focusing lens, is sequentially moved in accordance with the respective preset values, and (iii) determining, as a correction value, one of the preset values according to which the resulting modulation factors are substantially equal between two of the measurement signals indicative of time-varying amounts of light received on two of the light receiving areas located at two different positions along the radial direction of the optical disc; and a tracking control step of performing tracking control after the correction value is determined in the correction value determining step, by inputting to the lens drive unit a sum of the determined correction value and a control value determined for moving the focusing lens to a position corresponding to the desired track.

* * * * *